United States Patent
Ooura et al.

(10) Patent No.: US 6,600,000 B1
(45) Date of Patent: Jul. 29, 2003

(54) PROCESS FOR PRODUCING VINYL CHLORIDE POLYMER BY MEANS OF A UNIAXIAL ECCENTRIC SCREW PUMP

(75) Inventors: Makoto Ooura, Hasaki-machi (JP); Tadashi Amano, Kamisu-machi (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/511,317

(22) Filed: Feb. 23, 2000

(30) Foreign Application Priority Data

Apr. 9, 1999 (JP) ............................... 11-102701

(51) Int. Cl.⁷ ............................ C08F 14/06; C08K 5/09
(52) U.S. Cl. .................. 526/344; 526/319; 526/343; 526/347; 526/348; 524/323; 524/335; 524/347
(58) Field of Search ............................... 526/84, 83, 85, 526/344, 319, 343, 347, 348; 524/323, 335, 347

(56) References Cited

FOREIGN PATENT DOCUMENTS

| EP | 0 281 210 | 9/1988 |
|---|---|---|
| EP | 0 600 696 | 6/1994 |

OTHER PUBLICATIONS

Patent Abstracts of Japan, vol. 009, No. 309, Dec. 5, 1985, JP 60–149608, Aug. 7, 1985.
U.S. patent application Ser. No. 09/511,317, filed Feb. 23, 2000, pending.
U.S. patent application Ser. No. 09/634,638, filed Aug. 8, 2000, pending.

*Primary Examiner*—Robert D. Harlan
(74) *Attorney, Agent, or Firm*—Oblon, Spivak, McClelland, Maier & Neustadt, P.C.

(57) ABSTRACT

A process for producing a vinyl chloride polymer, the process including the steps of charging into a polymerization vessel, vinyl chloride or a monomer mixture containing vinyl chloride, water, and other materials necessary for polymerization, and polymerizing in an aqueous medium the vinyl chloride or the monomer mixture. An antioxidant is added to a mixture of materials before polymerization, or to a polymerization reaction mixture during polymerization or after polymerization. The antioxidant is added in the state of an aqueous dispersion and by means of a uniaxial eccentric screw pump. The aqueous antioxidant dispersion can be added at a constant rate and stably, without causing any block-up of the interior of the pump even when the polymerization vessel is held at a high internal pressure. Hence, vinyl chloride polymers having less uneven plasticizer absorption and having good anti-initial discoloration properties and thermal stability can be produced stably.

14 Claims, 1 Drawing Sheet

PROCESS FOR PRODUCING VINYL CHLORIDE POLYMER BY MEANS OF A UNIAXIAL ECCENTRIC SCREW PUMP

BACKGROUND OF THE INVENTION

1. Field of the Invention

This invention relates to a process for producing a vinyl chloride polymer. More particularly, it relates to a vinyl chloride polymer production process by which vinyl chloride polymers having less uneven plasticizer absorption and having good anti-initial discoloration properties and thermal stability can be produced stably.

2. Description of the Prior Art

In processes for producing vinyl chloride polymers by polymerizing in an aqueous medium a vinyl chloride polymer or a monomer mixture containing a vinyl chloride polymer, an antioxidant is conventionally added for the purpose of improving anti-initial discoloration and thermal stability of the vinyl chloride polymers to be obtained and also for keeping polymerization conversion constant and making uneven plasticizer absorption less occur. As to the time of its addition, it is added, e.g., before the polymerization is initiated, during polymerization, at the time the internal pressure has dropped at the last stage of polymerization, or before, during or after the recovery of remaining unreacted monomers. Especially because the antioxidant has a polymerization inhibitory action, it is usually added to a polymerization mixture at the last stage of polymerization also for the purpose of terminating the polymerization.

Since, however, antioxidants are usually in the form of powder, it is difficult to press the antioxidant into a polymerization vessel at a constant rate when the inside of the vessel stands pressurized at the last stage of polymerization. Accordingly, proposed are (1) a method in which an antioxidant is pressed into the polymerization vessel by means of a pump after the antioxidant has been dissolved in an organic solvent such as methanol and toluene, and (2) a method in which a powdery antioxidant is dispersed in an aqueous medium by the aid of a suspending agent or an emulsifying agent to form an aqueous antioxidant dispersion, which is then added by means of a pump. As the pump, a plunger pump and a diaphragm pump are described (Japanese Laying-open Publication No. 60-149608).

The method (1) enables its addition at a constant rate and without any problem even when the inside of the vessel stands pressurized. However, in an instance where monomers are polymerized in an aqueous medium, the organic solvent used to dissolve the antioxidant is included in an effluent emitted out of the polymerization vessel after the polymerization, bringing about the problem of an increase in COD in the effluent. Also, the organic solvent used may cause problems that it mixes into the resultant vinyl chloride polymer to cause an odor of the product and an odor at the time of processing it or that it mixes into monomers recovered when unreacted monomers are collected. Also, some antioxidants have a low solubility in organic solvents, where the organic solvents must be used in a large quantity to make the above problems more serious.

The method (2) can solve these problems. However, when the aqueous antioxidant dispersion is pressed into the polymerization vessel by means of a pump such as a plunger pump or a diaphragm pump when the polymerization vessel is held at an internal pressure of 0.3 to 1.2 MPa at the last stage of polymerization, the pump must have a pump-out pressure higher than the polymerization pressure, requiring a great mechanical energy. Because of such a great mechanical energy, particles contained in the aqueous antioxidant dispersion tend to break or aggregate in the pump at its ball check valve and so forth to which the mechanical energy is most applied especially when the dispersion is being fed. As the result, solid matter may accumulate at such portions to hinder the constant-rate feeding and may further block up the interior of the pump, making it impossible to feed the dispersion. The method (2) has such a great problem. This may seriously occur especially when the pump has a high pump-out pressure, and may cause a great difficulty when the antioxidant dispersion is press-added into the polymerization vessel when its inside stands pressurized at the last stage of polymerization.

SUMMARY OF THE INVENTION

Accordingly, an object of the present invention is to provide a vinyl chloride polymer production process that enables addition of the aqueous antioxidant dispersion at a constant rate and stably, without causing any block-up of the interior of the pump even when the polymerization vessel is held at a high internal pressure.

To achieve the above object, the present invention provides a process for producing a vinyl chloride polymer, the process comprising the steps of:

charging into a polymerization vessel, vinyl chloride or a monomer mixture containing vinyl chloride, water, and other materials necessary for polymerization; and polymerizing in an aqueous medium the vinyl chloride or the monomer mixture containing vinyl chloride;

an antioxidant being added to a mixture of materials before polymerization, or to a polymerization reaction mixture during polymerization or after polymerization, the antioxidant being added in the state of an aqueous dispersion and by means of a uniaxial eccentric screw pump.

DESCRIPTION OF THE PREFERRED EMBODIMENTS

Figure 1:
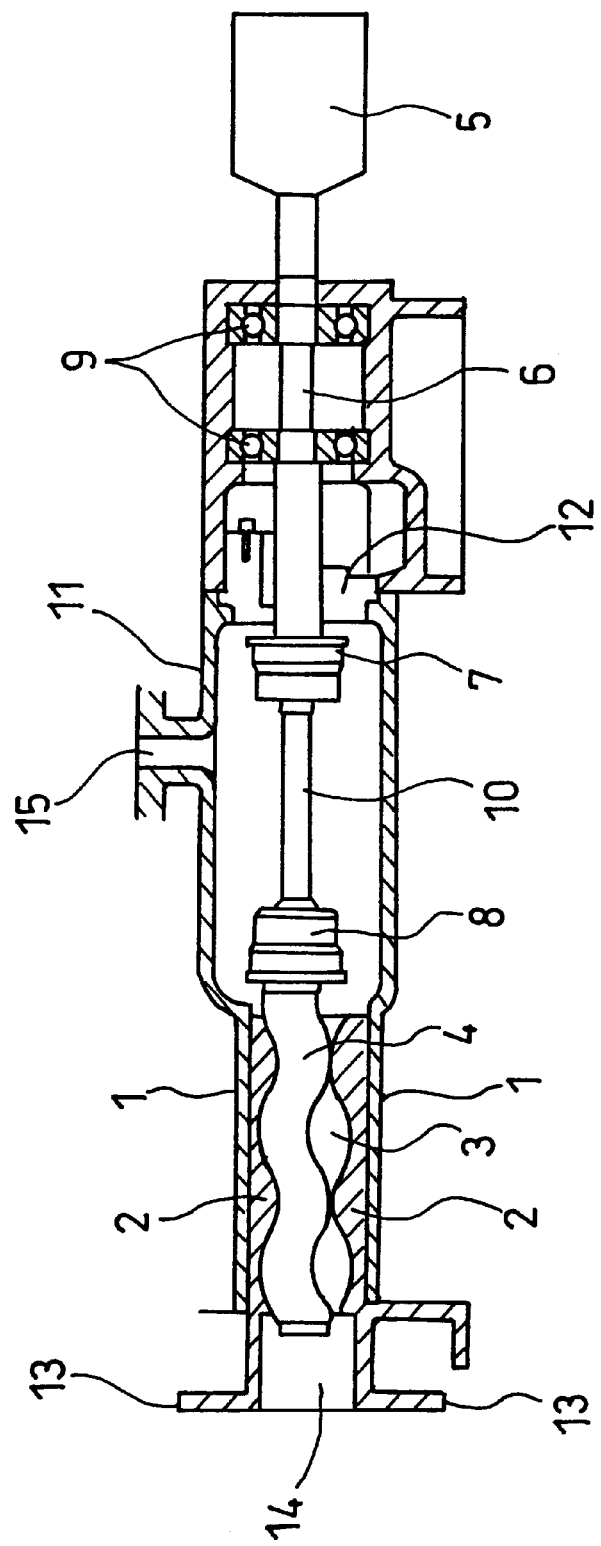
FIG. 1 is a schematic view of an example of the uniaxial eccentric screw pump used in the present invention.

The present invention will be described below in the order of process steps.

Polymerization Step:

In the present invention, vinyl chloride or a monomer mixture containing vinyl chloride is polymerized in a polymerization vessel in the presence of a polymerization initiator and a dispersant, in an aqueous medium and by a conventional method.

The monomer material to be polymerized is a vinyl chloride monomer or a monomer mixture containing vinyl chloride. The monomer mixture is a mixture of at least 50% by weight of vinyl chloride with a monomer copolymerizable with the vinyl chloride. The copolymerizable monomer may include, e.g., vinyl esters such as vinyl acetate and vinyl propionate; acrylates such as methyl acrylate and ethyl acrylate, or methacrylates; olefins such as ethylene and propylene; maleic anhydride; acrylonitrile; styrene; and vinylidene chloride. Any of these may be used alone or in combination of two or more types.

There are no particular limitations on the dispersant usable in the polymerization step. It may be any of those conventionally used in the production of vinyl chloride polymers. This dispersant may include, e.g., water-soluble cellulose ethers such as methyl cellulose, hydroxyethyl cellulose, hydroxypropyl cellulose, hydroxypropyl methyl cellulose; water-soluble polymers such as water-soluble partially saponified polyvinyl alcohol, acrylic acid polymers and gelatin; oil-soluble emulsifiers such as sorbitan monolaurate, sorbitan trioleate, glycerol tristearate and an ethylene oxide-propylene oxide block copolymer; and water-soluble emulsifiers such as polyoxyethylene sorbitan monolaurate, polyoxyethylene glycerol oleate and sodium laurate. Any of these may be used alone or in combination of two or more types.

The dispersant may usually be used in an amount of from 0.02 to 0.2 part by weight based on 100 parts by weight of the monomer.

There are no particular limitations also on the polymerization initiator. It may be any of those conventionally used in the production of vinyl chloride polymers. This polymerization initiator may include, e.g., percarbonates such as diisopropyl peroxydicarbonate, di-2-ethylhexyl peroxydicarbonate and diethoxyethyl peroxydicarbonate; perester compounds such as t-butyl peroxypivarate, t-hexyl peroxypivarate, t-butyl peroxyneodecanoate and α-cumyl peroxyneodecanoate; peroxides such as acetylcyclohexyl sulfonyl peroxide, 2,4,4-trimethylpentyl-2-peroxyphenoxyacetate and 3,5,5-trimethylhexanoyl peroxide; azo compounds such as zobis-2,4-dimethylvalerontrile and zobis(4-methoxy-2,4-dimethylvalerontrile); potassium eroxide; ammonium peroxide; and hydrogen peroxide. Any of hese may be used alone or in combination of two or more types.

The polymerization initiator may usually be used in an mount of from 0.01 to 0.3 part by weight based on 100 parts by weight of the monomer.

As the aqueous medium, deionized water is usually used. The aqueous medium in the polymerization step may usually be used in an amount of from 1.0 to 3.0 parts by weight based on 100 parts by weight of the monomer.

It is suitable for the polymerization to be carried out at a temperature ranging from 30 to 75° C.

Other conditions in the polymerization, e.g., the manner in which the aqueous medium, the vinyl chloride monomer or monomer mixture containing vinyl chloride monomer, the dispersant and the polymerization initiator are charged into the polymerization vessel, may be the same as those conventionally employed.

Antioxidant Addition Step:

The process of the present invention is characterized by this step of adding the antioxidant. A dispersion prepared by dispersing the antioxidant in an aqueous medium is added by means of a uniaxial eccentric screw pump.

The antioxidant used here may be any of oil-soluble antioxidants commonly used in the production of vinyl chloride polymers. This antioxidant may include, e.g., phenolic compounds such as 2,2-di(4'-hydroxyphenyl)propane, hydroquinone, p-methoxyphenol, t-butylhydroxyanisole, n-octadecyl-3-(4-hydroxy-3,5-di-t-butylphenyl) propionate, 2,5-di-t-butylhydroquinone, 4,4-butylidene-bis(3-methyl-6-t-butylphenol), 3,5-di-t-butyl-4-hydroxytoluene, 2,2'-methylene-bis(4-ethyl-6-t-butylphenol), triethylene glycol bis[3-(3-t-butyl-5-methyl-4-hydroxyphenyl) propionate], pentaerythritol tetrakist[3-(3,5-di-t-butyl-4-hydroxyphenyl) propionate], 2,6-di-t-butyl-4-methylphenol, t-butylcatechol, 4,4'-thiobis(6-t-butyl-m-cresol), tocopherol and nordihydroguaiaretic acid; semicarbaside, and semicarbaside derivatives such as 1-acetylsemicarbaside, 1-chloroacetylsemicarbaside, 1-dichloro-acetylsemicarbaside, 1-benzoylsemicarbaside and semicarbazone; carbohydrazide, thiosemicarbaside and thiosemicarbaside derivatives such as thiosemicarbazone; thiocarbaside, and thiocarbaside derivatives such as 1,5-diacetylthiocarbaside, 1-phenylthiocarbaside, 1,5-diphenylthiocarbaside and 1-methyl-1-phenyldithiocarbaside; amine compounds such as phenylnaphthylamine, N,N'-diphenyl-p-phenylenediamine and 4,4-bis(dimethylbenzyl)diphenylamine; nitro or nitroso compounds such as nitroanisole, N-nitrosodiphenylamine, nitroaniline and N-nitrosophenylhydroxylamine aluminum salt; phosphorus compounds such as triphenyl phosphite, diphenylisodecyl phosphite, phenyldiisodecyl phosphite, 4,4'-butylidene-bis(3-methyl-6-t-butylphenyl-di-tridecyl) phosphite, cyclic neopentanetetrayl-bis(octadecyl phosphite), tris(nonylphenyl)phosphite and tris (dinonylphenyl) phosphite; unsaturated hydrocarbon compounds such as styrene, 1,3-hexadiene and methylstyrene; and sulfur compounds such as dilauryl thiodipropionate, dimyristyl thiodipropionate, distearyl thiodipropionate, dodecyl mercaptan and 1,3-diphenyl-2-thiourea. Any of these may be used alone or in combination of two or more types. Of these, in view of good anti-initial discoloration properties of the resultant polymers and less adhesion of scales to the polymerization vessel, 3,5-di-t-butyl-4-hydroxytoluene, triethylene glycol bis[3-(3-t-butyl-5-methyl-4-hydroxyphenyl)propionate], t-butylhydroxyanisole, t-butylhydroquinone and octadecyl-3-(3,5-di-t-butyl-4-hydroxyphenyl)propionate are preferred.

The antioxidant is uniformly and stably dispersed in the aqueous medium by the aid of a suspending agent and optionally an emulsifying agent, and is used in the form of an aqueous dispersion. The suspending agent used here may include water-soluble partially saponified polyvinyl alcohol, water-soluble cellulose derivatives (e.g., hydroxypropyl methyl cellulose and hydroxyethyl methyl cellulose), gelatin, fatty acid partial esters of polyhydric alcohols (e.g., glycerol monostearate and sorbitol monolaurate), and polyoxyethyl esters of polyhydric alcohols. The emulsifying agent may include anionic emulsifiers which are alkali metal salts, alkaline earth metal or ammonium salts of higher fatty acids (e.g., lauric acid, palmitic acid and stearic acid), paraffinic sulfonic acids, alkyl alcohol sulfates or alkylaryl-sulfonid acids. Any of these suspending agent and emulsifying agent may be used alone or in combination of two or more types.

The suspending agent and emulsifying agent may be mixed in a proportion ranging from 10/0 to 3/7, and preferably from 10/0 to 5/5, in a weight ratio of suspending agent/emulsifying agent, since the volume resistivity and anti-initial discoloration of the resulting vinyl chloride polymer are affected at a controlled low level.

The antioxidant may preferably have an average particle diameter of from 0.5 to 50 $\mu$m, and more preferably from 1 to 10 $\mu$m. If it has too large a particle diameter, the resultant aqueous dispersion may have a low storage stability, where particles may settle or float to become separated to cause block-up in the pump, tank and piping. If it has too small a particle diameter, the dispersion may have an improved stability, but it takes much time and power to make the particles have a fine particle diameter, resulting in a high cost.

The antioxidant in the aqueous dispersion may usually be in a concentration ranging from 10 to 70% by weight, preferably from 20 to 70% by weight, and more preferably from 30 to 60% by weight. If the antioxidant is in too high a concentration, the resultant aqueous dispersion may have a low fluidity. If on the other hand it is in too low a concentration, the aqueous dispersion may have to be added in a large quantity.

There are no particular limitations on the concentration of the suspending agent in the aqueous antioxidant dispersion. In view of improving the state of dispersion of the antioxidant in the aqueous antioxidant dispersion and also keeping the viscosity of the dispersion within an appropriate range, it may preferably be in the range of from 0.01 to 10% by weight.

The aqueous antioxidant dispersion may be added before polymerization, during polymerization, particularly at the last stage of polymerization, or before collection, during collection or after collection of remaining unreacted monomers. In particular, it may preferably be added at the last stage of polymerization where the internal pressure of the polymerization vessel drops. The present invention can remarkably be effective when it is added at the time the internal pressure of the polymerization vessel has dropped to 0.3 to 1.2 MPa, and preferably 0.3 to 1.0 MPa, at the last stage of polymerization.

The aqueous antioxidant dispersion may usually be added in an amount of from 0.0001 to 0.5 part by weight in terms of the antioxidant, based on 100 parts by weight of the vinyl chloride monomer or monomer mixture containing vinyl chloride monomer charged into the polymerization vessel. Especially when it is added at the time the internal pressure of the polymerization vessel has come to 0.3 to 1.2 MPa, it may preferably be added in an amount of from 0.001 to 0.05 part by weight in terms of the antioxidant, in view of advantages that the polymerization reaction can be terminated effectively and vinyl chloride polymers having good anti-initial discoloration properties can be obtained.

In the present invention, when the aqueous antioxidant dispersion is added to the polymerization mixture, it is essential for it to be added by means of a uniaxial eccentric screw pump. This uniaxial eccentric screw pump is a pump comprising a internally double-threaded stator (made of an elastic material, having an oblong cross section), and an externally single-threaded rotor (made of a metal, having a round cross section) which is so inserted to the interior of the stator as to be rotatably engaged therewith so that a fluid (aqueous antioxidant dispersion) can be forwarded continuously while rotating the rotor eccentrically in the stator.

FIG. 1 shows an example of the uniaxial eccentric screw pump used in the present invention.

In a stator housing 1 which is cylindrical and made of a metal, an elastic stator 2 made of a synthetic rubber is fixed. To an internally threaded hole 3 (an oblong double-threaded space) formed in the stator 2, an externally threaded rotor 4 (a uniaxial eccentrically single-threaded member made of a metal) is so inserted as to be rotatably engaged with the stator. A drive shaft 6 transmits the rotation of a drive motor 5 to the main body of the pump. Universal joints 7 and 8 also transmit the rotation of the drive motor 5 to the externally threaded rotor 4. A bearing 9 supports the drive shaft 6. The universal joints 7 and 8 are connected through a coupling rod 10. A shaft sealer 12 prevents the fluid from running along the drive shaft 6 to leak outside; the fluid being sucked into the pump casing 11.

An end stud 13 forms a discharge outlet 14, and is connected to piping (not shown) through which the fluid discharged out of the discharge outlet is transported. A fluid suction inlet 15 is also formed at the head of the pump casing 11.

The rotation of the drive motor 5 is transmitted to the drive shaft 6 and is further transmitted to the externally threaded rotor 4 through the universal joint 7, coupling rod 10 and universal joint 8. This externally threaded rotor 4 rotates on the eccentric shaft center. The externally threaded rotor 4 reciprocates while rotating the interior of the elastic stator 2. The space formed between the externally threaded rotor 4 and the elastic stator 2 is, severely sealed along a tangent line formed between the externally threaded rotor 4 and the elastic stator 2. The seal line thus formed continues from the suction side to the discharge side. With the rotation of the drive motor 5, the fluid is sucked into the pump casing 11. The fluid sucked into this pump casing 11 is, with the rotation of the externally threaded rotor 4, forwarded into the space formed between the externally threaded rotor 4 and the elastic stator 2 and then discharged through the discharge outlet 14.

Use of this uniaxial eccentric screw pump according the antioxidant addition step of the present invention enables prevention of the solid matter that may occur when the conventional plunger pump or diaphragm pump is used. Hence, the interior of the pump can be free from being blocked up with it and the fluid can always be fed at a constant rate. Even if any solid matter has occurred in the pump, the fluid is so forwarded as to be forced out together with the solid matter, and hence the interior of the pump is by no means blocked up.

In the present invention, a polymerization modifier, a chain transfer agent, a pH adjuster, a gelation improver, an antistatic agent and so forth which are commonly used in the production of vinyl chloride polymers may optionally appropriately be added to the polymerization mixture before the polymerization is initiated, in the course where the polymerization is carried out or after the polymerization is completed. For the purposes of, e.g., inhibiting polymerization reaction and preventing the resultant polymer from deteriorating, any antioxidant other than the one described previously may also be added as long as it does not obstruct the effect of the present invention, which may be added before the polymerization is initiated, in the course where the polymerization is carried out or after the polymerization is completed.

EXAMPLES

The present invention will be described in greater detail by giving Examples and Comparative Examples.

Example 1

Into a polymerization vessel having a internal volume of 2 $m^3$ and made of stainless steel, 980 kg of deionized water, 382 g of partially saponified polyvinyl alcohol having a degree of saponification of 80.5 mole % and 143 g of hydroxypropyl methyl cellulose having a degree of methoxy-substitution of 28.5% by weight and a degree of hydroxypropoxy-substitution of 8.9% by weight were charged. The inside of the polymerization vessel was evacuated until its internal pressure reaches 60 mmHg, and thereafter 700 kg of vinyl chloride monomer was charged. With stirring, 350 g of a polymerization initiator di-2-ethylhexyl peroxydicarbonate was charged and simultaneously hot water was passed through the jacket to begin to raise the temperature. At the time the internal temperature of the polymerization vessel reached 57.0° C., the polymerization was carried out while keeping that temperature.

At the time the internal pressure of the polymerization vessel dropped to 0.588 MPa (polymerization conversion at this stage: 86%), an aqueous antioxidant dispersion A as shown in Table 1 was press-added into the polymerization vessel for 2 minutes by means of a uniaxial eccentric screw pump (trade name: MOHNO PUMP, the uniaxial eccentric screw pump shown in FIG. 1; manufactured by Heishin Soubi K.K.; Model 6NE-08) at the number of pump revolutions of 140 rpm. The aqueous antioxidant dispersion A added to the polymerization mixture held in the polymerization vessel was in an amount of 420 g as so intended. Unreacted monomers were collected, and the resultant polymer slurry was dehydrated and then dried to obtain a vinyl chloride polymer.

The above operation as one batch was repeated by 10 batches. The aqueous antioxidant dispersion on the 10th batch was in an amount of 420 g as so intended, which did not change from that in the 1st batch. After the 10th-bath operation was completed, the interior of the pump was examined, but any solid matter was not found to have adhered.

The plasticizer absorption, anti-initial discoloration properties, thermal stability and bulk density of the vinyl chloride polymer obtained after the 10th-batch operation were measured in the following way and also the value of COD of polymerization effluent flowed out of the production process was measured according to JIS K0102.

Results obtained are shown in Table 2.

Comparative Example 1

Polymerization was carried out in the same manner as in Example 1 except that the uniaxial eccentric screw pump was replaced with a diaphragm pump (trade name: IS2AZ-02-20DID SP; manufactured by Nikkiso K. K.) and the aqueous antioxidant dispersion A was pressed into the polymerization vessel for 2 minutes under a pump stroke set at 37.8%. The aqueous antioxidant dispersion A added to the polymerization mixture was in an amount of 422 g as so intended. Unreacted monomers were collected, and the resultant polymer slurry was dehydrated and then dried to obtain a vinyl chloride polymer.

This operation was repeated by 8 batches, but it was unable at all to press the aqueous antioxidant dispersion into the polymerization vessel on the 8th batch. The interior of the pump was examined to find that white solid matter had blocked up the pump at its ball check valve.

The plasticizer absorption, anti-initial discoloration properties, thermal stability and bulk density of the vinyl chloride polymer obtained after the 8th-batch operation and the value of COD of polymerization effluent were measured in the same manner as in Example 1.

Results obtained are shown in Table 2.

Comparative Example 2

Polymerization was carried out in the same manner as in Comparative Example 1 except that the aqueous antioxidant dispersion A was replaced with an aqueous antioxidant dispersion B shown in Table 1 and the number of revolutions of the pump was changed to 350 rpm. The aqueous antioxidant dispersion added to the polymerization mixture was in an amount of 1,050 g.

The plasticizer absorption, anti-initial discoloration properties, thermal stability and bulk density of the vinyl chloride polymer thus obtained and the value of COD of polymerization effluent were measured in the same manner as in Example 1.

Results obtained are shown in Table 2.

Comparative Example 3

Polymerization was carried out in the same manner as in Comparative Example 1 except that the aqueous antioxidant dispersion A was replaced with an aqueous antioxidant dispersion C shown in Table 1 and the number of revolutions of the pump was changed to 200 rpm. The aqueous antioxidant dispersion added to the polymerization mixture was in an amount of 600 g.

The plasticizer absorption, anti-initial discoloration properties, thermal stability and bulk density of the vinyl chloride polymer thus obtained and the value of COD of polymerization effluent were measured in the same manner as in Example 1.

Results obtained are shown in Table 2.

TABLE 1

| | Antioxidant | Dispersant or solvent | Concentration of antioxidant (wt. %) | Suspending agent | Average particle diameter of antioxidant ($\mu$m) |
|---|---|---|---|---|---|
| Antioxidant dispersion A: | 3,5-di-t-butyl-4-hydroxy-toluene | water | 50 | water-soluble partially saponified polyvinyl alcohol and hydroxypropyl methyl cellulose | 4.1 |
| Antioxidant dispersion B: | 3,5-di-t-butyl-4-hydroxy-toluene | methanol | 20 | — | (uniform solution) |
| Antioxidant dispersion C: | triethylene glycol bis[3-(3-t-butyl-5-methyl-4-hydroxy-phenyl) propionate] | acetone | 35 | — | (uniform solution) |

| | Example 1 | Comparative Example 1 | Comparative Example 2 | Comparative Example 3 |
|---|---|---|---|---|
| Antioxidant dispersion: | A | A | B | C |
| Number of polymerization batch: | 10 | 8 | 1 | 1 |
| Amount of antioxidant added*: | 0.03 | 0.03 | 0.03 | 0.03 |
| Plasticizer absorption: (min.) | 15.0 | 17.1 | 15.1 | 14.8 |
| Anti-initial discoloration properties: | A | C | A | A |
| Thermal stability: (min.) | 90 | 75 | 90 | 95 |
| Bulk density: (g/cc) | 0.530 | 0.541 | 0.529 | 0.531 |
| COD of polymerization effluent: (mg/l) | 40 | 31 | 450 | 320 |

*Part by weight of the antioxidant added to the polymerization mixture, based on 100 parts by weight of the monomer charged.

Plasticizer Absorption:

400 g of the polymer was put into a Blabender Plastograph fitted with a stirrer, having a jacket temperature adjusted to 80° C., and was preheated with stirring. Thereafter, 200 g of dioctyl phthalate was added, and the time taken until it was evaporated to dryness was measured.

Anti-initial Discoloration Properties:

100 parts by weight of the polymer was mixed with 1 part by weight of tin laurate, 0.5 part by weight of a cadmium type stabilizer and 50 parts by weight of dioctyl phthalate. The mixture obtained was kneaded at 160° C. for 5 minutes by means of a roll mill, followed by press molding to produce a sheetlike sample.

Using as a reference a sample produced from the polymer obtained in Example 1, a sample having substantially the same anti-initial discoloration properties as the former sample was evaluated as "A"; a sample somewhat inferior thereto, as (B); and a sample greatly inferior thereto, as (C).

Thermal Stability:

The sheetlike sample produced as the sample for measuring the anti-initial discoloration properties was put in a Geer oven maintained at a temperature of 185° C. The time taken until the sample blackened was measured.

Bulk Density:

1 kg of the polymer was put into a planetary mixer, and was stirred for 10 minutes. Thereafter, its bulk density was measured according to JIS K6721.

Measurement of COD of Polymerization Effluent:

COD in the polymerization effluent was measured by a method of measuring oxygen consumption ascribable to potassium permanganate ($COD_{MN}$) at 100° C. as prescribed in JIS K0102.

As described above, according to the process of the present invention, the aqueous antioxidant dispersion can be added at a constant rate and stably, without causing any block-up of the interior of the pump even when the polymerization vessel is held at a high internal pressure. Hence, vinyl chloride polymers having less uneven plasticizer absorption and having good anti-initial discoloration properties and thermal stability can be produced stably.

What is claimed is:

1. A process for producing a vinyl chloride polymer, the process comprising the steps of:

charging into a polymerization vessel, vinyl chloride or a monomer mixture containing vinyl chloride, water, and other materials necessary for polymerization; and polymerizing in an aqueous medium the vinyl chloride or the monomer mixture containing vinyl chloride;

an antioxidant being added to a mixture of materials before polymerization, or to a polymerization reaction mixture during polymerization or after polymerization, the antioxidant being added in the state of an aqueous dispersion and by means of a uniaxial eccentric screw pump, thereby not causing any block-up of the interior of the pump.

2. The process of claim 1, wherein said aqueous dispersion is added at the time the internal pressure of the polymerization vessel is held in the range of from 0.3 MPa to 1.2 MPa at the last stage of polymerization.

3. The process of claim 1, wherein the antioxidant in said aqueous dispersion is in a concentration ranging from 10% by weight to 70% by weight.

4. The process of claim 1, wherein the antioxidant added is in an amount of from 0.0001 part by weight to 0.5 part by weight based on 100 parts by weight of the vinyl chloride or monomer mixture containing vinyl chloride.

5. The process of claim 1, wherein the antioxidant in said aqueous dispersion has an average particle diameter of from 0.5 $\mu$m to 50 $\mu$m.

6. The process of claim 1, wherein said antioxidant is an oil-soluble antioxidant selected from the group consisting of a phenolic compound, semicarbaside and a derivative thereof, thiosemicarbaside and a derivative thereof, an amine compound, a nitro compound, a nitroso compound, a phosphorus compound, an unsaturated hydrocarbon compound, and a sulfur compound.

7. The process of claim 1, wherein said antioxidant is selected from the group consisting of 3,5-di-t-butyl-4-hydroxytoluene, triethylene glycol bis[3-(3-t-butyl-5-methyl-4-hydroxyphenyl propionate), t-butylhydroxyanisole, t-butylhydroquinone, and octadecyl-3-(3,5-di-t-butyl-4-hydroxyphenyl)propionate.

8. The process of claim 1, wherein said aqueous dispersion is prepared using a suspending agent.

9. The process of claim 8, wherein the suspending agent is used in a concentration of from 0.01% by weight to 10% by weight.

10. The process of claim 8, wherein said suspending agent is selected from the group consisting of water-soluble partially saponified polyvinyl alcohol, a water-soluble cellulose derivative, gelatin, a fatty acid partial ester of a polyhydric alcohol, and a polyoxyethyl ester of a polyhydric alcohol.

11. The process of claim 8, wherein an emulsifying agent is used in combination with said suspending agent.

12. The process of claim 11, wherein said suspending agent and said emulsifying agent are in a proportion of from 10/0 to 3/7 in a weight ratio of suspending agent/emulsifying agent.

13. The process of claim 9, wherein said emulsifying agent is an anionic emulsifier comprising an alkali metal salt, alkaline earth metal salt or ammonium salt of a higher fatty acid, paraffinic sulfonic acid, alkyl alcohol sulfate or alkylarylsulfonic acid.

14. The process of claim 1, wherein said monomer mixture is a mixture of a vinyl chloride monomer with a compound selected from the group consisting of a vinyl ester, an acrylate, a methacrylate, an olefin, maleic anhydride, acrylonitrile, styrene, and vinylidene chloride.

* * * * *